Jan. 17, 1933.  H. E. ALTGELT  1,894,458

CONTROL LOCK

Filed March 9, 1928

Inventor.
Herman E. Altgelt,
By John P Smith
Atty.

Patented Jan. 17, 1933

1,894,458

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

CONTROL LOCK

Application filed March 9, 1928. Serial No. 260,480.

This invention relates to a control mechanism and is particularly adapted for use in connection with controlling the position or the adjustment of the valve and the like on carburetors, vehicle heaters, exhaust cut-outs, ventilators or shutters of radiator covers and the like.

One of the objects of the present invention is to provide a simple and efficient control mechanism, in which the cost of manufacture thereof is reduced to a minimum, and which consists of a minimum number of parts and is adapted to be connected to various adjustable contrivances for locking the same in various positions of adjustment.

A further object of the invention is to provide a control mechanism which is made of a minimum number of parts and consists essentially of the addition of a single spring to the control rod and the frame in which the rod is mounted, for frictionally locking the control rod in various positions of adjustment.

These and other objects are accomplished by the construction of a control lock in which a spring is mounted in an aperture which is common to the sliding rod, and offers frictional resistance to the movement of the rod within the aperture.

Referring to the drawing, Fig. 1 is a fragmentary side elevational view of a motor vehicle showing my control lock mounted thereon and operatively connected up with a carburetor valve.

Figure 1:
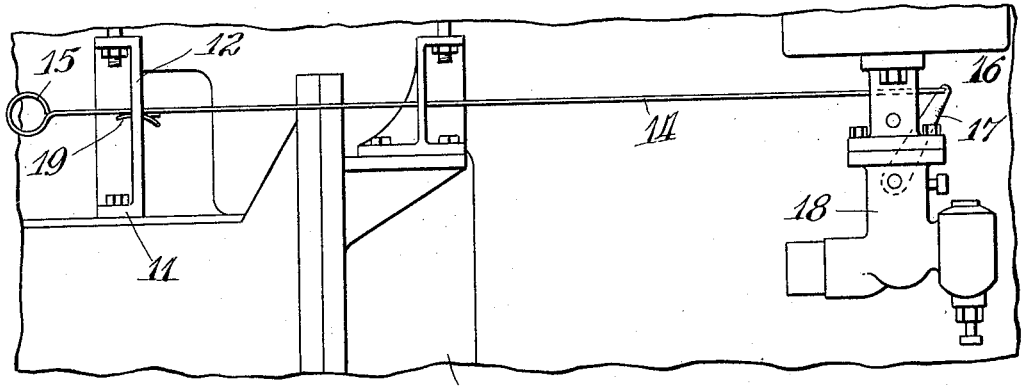
Figure 2:
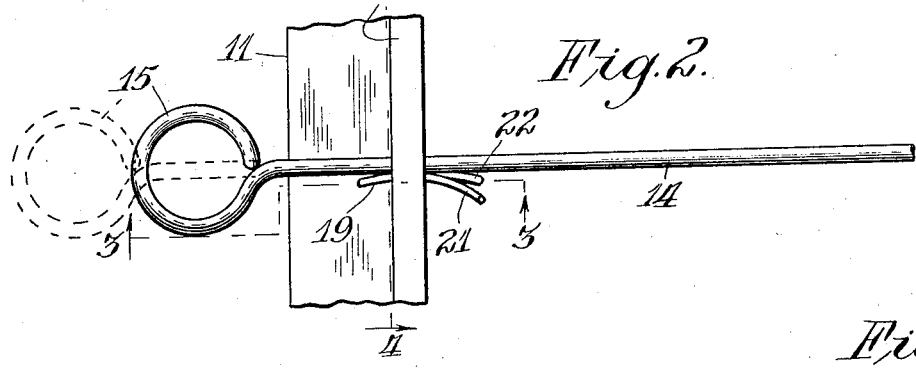
Fig. 2 is an enlarged, detailed, side elevational view of my improved control lock, showing the manner in which the rod may be adjusted.
Figure 3:
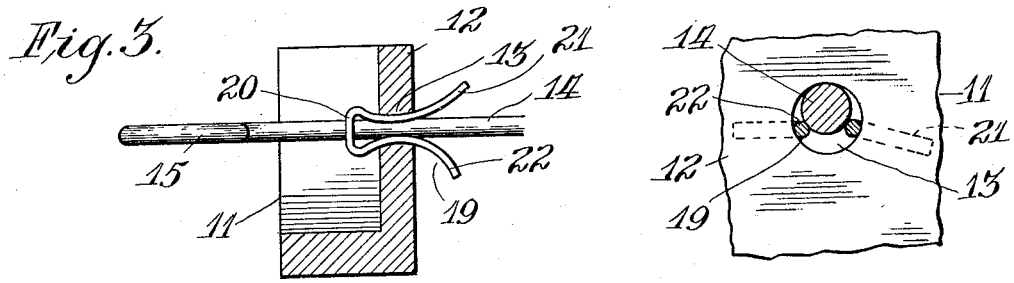
Fig. 3 is a cross sectional view taken on the line 3—3 of Fig. 2.

In illustrating one form of my invention, I have shown the same in connection with a control rod for adjusting the valve of a carburetor on a motor, but it will of course, be understood, that my improved control lock may be used in connection with various contrivances which require an adjustment, such, for example, as valves for vehicle heaters, exhaust cut-outs, and the adjustment of shutters for engine radiators, or, in fact, any other type of contrivance which may require a periodical adjustment.

In the drawing I have illustrated my invention in connection with a motor vehicle comprising a frame, generally referred to by the reference character 10. Mounted on the frame 10 and secured thereto in any well known manner is a bracket 11, which has a transversely extending flange 12 formed integrally therewith. Reciprocally mounted in an aperture 13 of the flange 12 is an adjustable control rod 14, which has one of its ends thereof provided with an eye 15, so that the same may be easily gripped by the hand of the operator for adjusting the rod. The other end of the rod is pivotally connected as shown at 16 to the valve lever 17 of the carburetor 18 of the motor.

Figure 4:
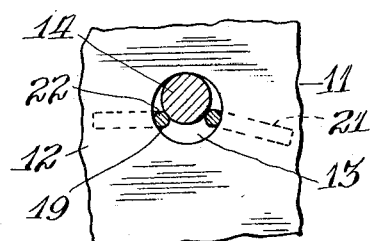
Fig. 4 is an enlarged, detailed, cross sectional view taken on the line 4—4 of Fig. 2.
Figure 5:
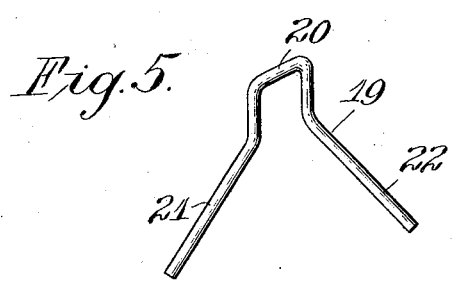
Fig. 5 is an enlarged, perspective view of my improved form of spring which urges the rod to one side of the aperture for frictionally locking the rod in various positions of adjustment.

The aperture 13 in the frame or bracket 11 in which the adjustable control rod 14 is mounted, is of a considerably larger diameter than the diameter of the rod, for the purpose of permitting the insertion of my improved form of spring, generally referred to by the reference character 19. This spring has a substantially inverted U shaped head as shown at 20, and has a relatively larger width across the head, than the diameter of the aperture 13. The lower or free ends 21 and 22 of the spring are bent laterally outwardly in a direction away from each other from the plane of the U shaped head 20, as clearly shown in Fig. 5, and when the free ends are inserted in the aperture 13 so as to contact with the sides of the aperture and one side of the control rod 14, the rod is forced by this spring pressure against the side of the aperture, as clearly shown in Fig. 4, thereby resisting the movement of the control rod with respect to the frame or bracket, locking the control rod in the various positions to which the same is adjusted.

It is quite obvious that the frictional resistance offered to the adjustment of the control rod may be made in accordance with the requirements in which my improved control lock is used. That is, where greater resistance is needed to more positively lock the rod in various positions of adjustment, the flange 12 of the frame or bracket may be relatively thicker so that the aperture 13 will have a greater surface, and the spring made of a heavier gauge wire. Such a change or modification of the device illustrated in the drawing and described in the specification, is, of course, within the contemplation of my invention.

In the above specification it will be seen that I have provided a very simple and inexpensive control lock, which requires only the addition of a relatively short piece of spring wire inserted in the aperture with the control rod, for locking the rod in various positions of adjustment. This simple construction reduces the cost of manufacture to an infinitesimal amount over the cost of other devices heretofore made for accomplishing the same purpose.

While in the above specification I have described one embodiment which my invention may assume in practice, it will of course, be understood that the same is capable of modification and that modification may be made without departing from the spirit and scope of the invention. It will be further noted that while I have illustrated and described my control lock as adaptable to various adjustable contrivances used in connection with motors and motor vehicles the same is capable of being used in connection with and adaptable to other adjustable devices not necessarily associated with motors, or motor vehicles.

What I claim as my invention and desire to secure by Letters Patent is:

1. A control mechanism comprising a frame having an aperture therein, a reciprocable rod mounted in said aperture and yielding unsecured means mounted in and extending through said aperture and located on one side of and engaging said rod for resisting the movement of said rod with respect to said frame.

2. A control mechanism comprising a frame having an aperture therein, a reciprocable rod mounted in said aperture and unsecured means extending through the aperture and engageable with one side of said rod for frictionally resisting the movement of said rod with respect to said frame.

3. A control mechanism comprising a frame having an aperture therein, a reciprocable rod mounted in said aperture, a detached spring wire extending longitudinally through said aperture and engaging said rod for frictionally resisting the movement of said rod with respect to said frame.

4. A control mechanism comprising a frame having an aperture therein, a reciprocable rod mounted in said frame, a substantially U shaped spring having the legs thereof extending through said aperture and engaging said rod, for frictionally locking said rod with respect to said frame.

5. A control mechanism comprising a frame having an aperture therein, a control rod mounted in said frame, and a substantially U shaped spring mounted in said aperture and engaging said control rod for locking the same in various positions of adjustment in said frame, said spring having an enlarged head and divergent free ends for preventing displacement of said spring from said aperture.

In testimony whereof I have signed my name to this specification, on this 5th day of March A. D. 1928.

HERMAN E. ALTGELT.